(12) United States Patent
Nolan et al.

(10) Patent No.: US 9,621,486 B2
(45) Date of Patent: Apr. 11, 2017

(54) SYSTEM AND METHODS FOR ASSIGNING COMMUNICATION REQUESTS TO RANGE OF TRANSMISSION CONTROL PROTOCOL PORTS

(71) Applicant: Radio Systems Corporation, Knoxville, TN (US)

(72) Inventors: Christopher Lynn Nolan, Athens, TN (US); Richard Alan Seltzer, Knoxville, TN (US); Tyson Dean Hester, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 71 days.

(21) Appl. No.: 14/657,698

(22) Filed: Mar. 13, 2015

(65) Prior Publication Data

US 2015/0263918 A1 Sep. 17, 2015

Related U.S. Application Data

(60) Provisional application No. 61/953,425, filed on Mar. 14, 2014.

(51) Int. Cl.
*H04L 12/26* (2006.01)
*H04L 12/931* (2013.01)
(Continued)

(52) U.S. Cl.
CPC .............. *H04L 49/50* (2013.01); *H04L 49/25* (2013.01); *H04L 69/16* (2013.01); *H04L 41/083* (2013.01); *H04L 67/22* (2013.01)

(58) Field of Classification Search
CPC ....... H04L 43/0811; H04L 49/25; H04L 49/50
(Continued)

(56) References Cited

U.S. PATENT DOCUMENTS

| 2004/0051650 A1 | 3/2004 | Gonsoulin et al. |
| 2007/0058634 A1* | 3/2007 | Gupta ................... H04L 67/12 370/392 |

(Continued)

OTHER PUBLICATIONS

International Search Report from PCT/US2015/020519 mailed Jun. 25, 2015.
(Continued)

*Primary Examiner* — Charles C Jiang
*Assistant Examiner* — Wali Butt
(74) *Attorney, Agent, or Firm* — Baker Donelson (57) ABSTRACT

A system is described that includes devices detecting and periodically transmitting data of events and conditions within an environment. The devices are communicatively coupled with applications running on processors of a remote server. The devices periodically request a connection with the applications, wherein the applications monitor a range of port numbers for receiving the devices' connection requests. The devices request connections at corresponding port numbers among the monitored range of port numbers. The applications accept the connection requests from the devices at the corresponding port numbers, wherein the devices transmit the data to the one or more applications during corresponding communication sessions. The applications evaluate attributes of the devices' connection requests and communication sessions and manage assignment of the devices to port numbers using information of the evaluating.

31 Claims, 4 Drawing Sheets

(51) Int. Cl.
*H04L 12/947* (2013.01)
*H04L 29/06* (2006.01)
*H04L 12/24* (2006.01)
*H04L 29/08* (2006.01)

(58) Field of Classification Search
USPC ............... 370/250, 252, 315, 329, 390, 392;
709/220, 222, 224, 230, 239
See application file for complete search history.

(56) References Cited

U.S. PATENT DOCUMENTS

| | | | |
|---|---|---|---|
| 2007/0060147 A1 | 3/2007 | Shin et al. | |
| 2008/0056261 A1* | 3/2008 | Osborn | H04L 12/2834 370/392 |
| 2012/0015665 A1 | 1/2012 | Farley et al. | |
| 2012/0257624 A1* | 10/2012 | Thubert | H04W 40/246 370/390 |
| 2013/0094430 A1* | 4/2013 | Mills | H04W 24/06 370/315 |
| 2013/0278427 A1 | 10/2013 | Setton | |
| 2014/0335839 A1* | 11/2014 | Rubin | H04W 4/06 455/416 |

OTHER PUBLICATIONS

Written Opinion of the International Searching Authority for PCT/US2015/020519 mailed Jun. 25, 1015.

\* cited by examiner

SYSTEM AND METHODS FOR ASSIGNING COMMUNICATION REQUESTS TO RANGE OF TRANSMISSION CONTROL PROTOCOL PORTS

CROSS REFERENCE TO RELATED APPLICATIONS

This application claims the benefit of U.S. Application No. 61/953,425, filed Mar. 14, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BRIEF DESCRIPTION

An internet port hopping application is described herein for communicating with an internet aware device hub located on-premise or in a home and communicatively coupled to end user devices that are equipped with RF transmitters. The internet aware hub listens for connection requests from end user devices (i.e., dog collar, water bowl, pet door, food dispenser). The hub collects data from the transmitting devices for subsequent delivery to a cloud application server. The hub then initiates a conversation with the cloud server using a TCP socket, sends the data to server for processing and closes the connection. The problem arises in that a single TCP Socket will only allow a finite number of connections. When reaching capacity, a connection request will under an embodiment be rejected until a connection becomes available.

BRIEF DESCRIPTION OF THE DRAWINGS

So that the manner in which the present application can be better understood, certain illustrations and figures are appended hereto. It is to be noted, however, that the drawings illustrate only selected embodiments and elements of a system and method for assigning communication requests to a range of transmission control protocol ports and are therefore not to be considered limiting in scope for such system and method as described herein may admit to other equally effective embodiments and applications.

DETAILED DESCRIPTION

A system and method for tracking, collecting and reporting data generated in the environment of a premise location is provided herein. Under one embodiment, the movement, activity and/or position of an animal in such environment represent data generating events. The combination of an on-premise internet aware device hub and a distributed set of end user detection/monitoring/reporting devices cooperate to provide an on-premise monitoring, data collection and reporting network.

The end user devices generally monitor the environment and produce event/detection data. Under, one embodiment, an end user device may represent a receiver worn by an animal. The receiver may register "position" or "proximity" events when the receiver is in proximity to certain other detection devices, e.g. magnetic field generating transmitter coils. As one example of event data, the receiver may interact with the magnetic field of a transmitter coil to detect polarity information which corresponds to a position of the receiver relative to the transmitter coil. In turn the transmitter coil may be positioned near a monitored threshold, in/out door, or a food dispensing device. The receiver therefore tracks position data which may be used to track the position of the animal wearing the receiver. In addition to event data, each end user device may track and report upon the status of its own operating condition. The end user devices intermittently report event, status (or other collected information) to the device hub.

As indicated above, an internet aware device huh may be located on-premise or in a home. The "home" or "local" device hub communicates with and listens to end user devices that are equipped with RF transmitters. The end user device may include a dog collar component, a water howl component, a pet door component, or a food dispenser component. The transmitter equipped devices register with the device hub to form a network of end user devices. During registration with the hub, each local device receives a network specific address or specific identifier that the hub (and server application as described below) may use for queuing/storing incoming data traffic and for addressing such data for delivery back to specific end user devices. The local hub may monitor multiple devices.

The end user devices may include RF transmitters for communicating with the local huh. In order to conserve the limited battery power available to each such device, the device transmitters only periodically communicate with the hub. In the interim between transmission sessions, an end user device may collect and queue data for later delivery. The end user devices may under an embodiment communicate with the local hub using ZigBee or Z-wave communication protocols but embodiments are not so limited. In turn the hub may communicate with a router via WiFi or Ethernet but embodiments are not so limited.

As indicated above, an end user device (i.e., a receiver) may detect and report the position of an animal. The receiver may for example interact with a transmitter coil to detect the presence of an animal at a given location, i.e. near a food dispenser. The receiver may under an embodiment queue detection data along with corresponding time stamps and other metadata. The receiver device periodically reports this positioning and corresponding metadata to the hub. Although incoming RF transmissions are intermittent in order to minimize power consumption, the hub is constantly listening for device initiated communications. The hub collects data from all the devices within the network. The hub itself then intermittently (e.g. every fifteen seconds under one embodiment) checks in with a cloud server application to deliver queued data to a server application running on the cloud server as further described below.

It should be noted that the hub may not have received/queued any data for a particular device when the hub checks in with the server application. In such event, the hub may simply transmit a message to the server application indicating the absence of queued data for such device. In other words, the transmitted data for such device may comprise a unique message indicating the lack of queued data for such device. Under one embodiment, this is how the server is able to send data to the hub even when no upstream data is ready to be sent.

The nature of the data collected and transmitted by an end user device will vary depending on the type of the device. As one example, a Containment Collar may collect and transmit data including proximity to boundary, escape alerts, battery level, and history of escapes or challenges. As another example, an Activity Collar may collect and transmit data including an infinite list of behaviors and associated times. As another example, a Pet Door may collect and transmit data including access restrictions, pet transition numbers and times, and pet names. As another example, Food/Water Bowls may collect and transmit data including animal interactions, "low" conditions, and dirty filters. As yet another example, cameras may collect and transmit data including "motion detected" data. In general and under one embodiment, command and control data are sent to end user devices and status data are received from the end user devices.

A local hub may also receive out of network communications from an unregistered device. For example, an animal carrying a device (e.g. receiver) belonging to a foreign network, i.e. registered to and communicating with a foreign hub, may stray into local coverage and into range of the home network. Both the local and foreign hubs listen for all incoming communication requests and both detect communications from the same roaming receiver. The foreign hub processes the transmission as an in network communication while the local hub registers the transmission as a "distress" signal. Both hubs pass the data through a router and a wide area network to a server application (described below) running on one or more processors of a remote server.

A server application executing on one or more processors of a remote server receives data from devices that are communicatively coupled with the local hub. However, the application also receives data from devices belonging to foreign networks, end user devices communicatively coupled to corresponding foreign hubs, and devices alternatively connecting to the server under alternative means (see FIG. 2 and corresponding description). In other words, the server application is charged with managing incoming data flow from all hub clients (and respective end user devices) and devices otherwise coupled with the server application. The server application must deal with a tremendous amount of incoming data.

The server application is also charged with passing data back to end user devices. However, the server application must reach into the local network in the face of a client server architecture which initiates upstream communications from device to hub and then hub to application. As an additional challenge, end user devices and hub clients only initiate communication requests on a periodic basis. In order to reach back into a premise network, the server application opportunistically passes data back downstream when the hub initiates a communication session. In like fashion, the hub forwards data along to end user devices when devices initiate contact with the hub. An example of data travelling from device to application and back to device follows.

Figure 1:
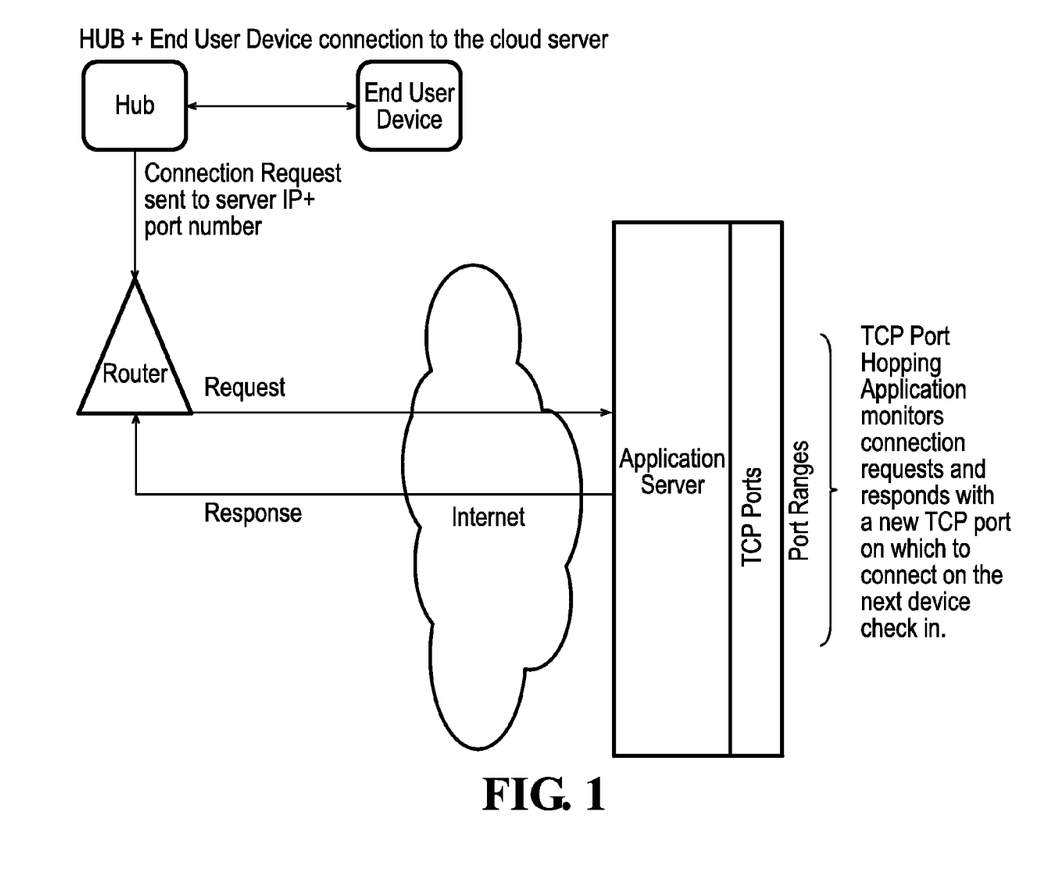
FIG. 1 is a diagram of an end user device communicating with an application server through an internet aware hub under an embodiment.

FIG. 1 shows a communication pathway from end user device to cloud based application server. As seen in FIG. 1, the end user device is communicatively coupled with a local hub. Under an embodiment, the end user device transmits data periodically to the hub which continuously monitors incoming data traffic. Although the hub actively listens for incoming transmissions, the hub itself only periodically initiates a connection with the server application. Accordingly, the hub collects data from in-network devices in preparation for sending the aggregated data from all such devices in its next hub-server interaction. As shown in FIG. 1, the hub may under an embodiment be communicatively coupled to a local area network or WIFI router which is further coupled to a wide area network thereby providing internet connectivity. The hub initiates a TCP/IP session with a server side communication endpoint. The server side application accepts the request and initiates a "send/receive" session with the hub. The use of a TCP communication session itself introduces trafficking issues on the server network ports. The nature of the TCP session and corresponding traffic issues are described in greater detail below. Of interest at this junction is the server application's use of the communication request and subsequent "send/receive" session to transmit device specific instructions back to the hub for subsequent delivery to local network devices. From the perspective of the local network, the hub accumulates data packets but this time in anticipation for downstream delivery. When a local device next checks into the hub, the hub checks to see if data is queued from such device. If so, the hub seizes the opportunity to deliver queued data back to that device in response to the device initiated communication.

At the level of the home network, the hub simply intermediates communications between the server side application and the devices locally registered with the hub. Throughput remains minimal at the level of the hub. The task of data traffic management becomes exponentially more difficult at the level of the server application which receives data communication requests across a great number of hubs each of which initiate communication requests on behalf of locally registered devices.

Problems arise when multiple connection requests arrive at a single server side communication endpoint. The difficulty lies in the TCP communication medium which warrants further consideration at this point. In establishing a TCP/IP communication pathway, a server creates a communication endpoint using TCP socket calls. The server first creates a TCP socket, binds the socket to a listen port and then instructs the port to listen for incoming communication requests. The hub client also generates a socket and passes the IP address and port number of the listening endpoint to a connect( ) method call. Initial connection requests land at a particular port. However a port may only accept 60,000 simultaneous connections under one embodiment. It should be noted that 60,000 is an approximate number and may vary (i.e. either increase or decrease) under alternative embodiments. The next connection will be denied. Under one embodiment, the server application must accommodate saturation by reassigning clients to alternative ports.

When the server application considers reassignment, it does so in an effort to maximize the overall rate of upstream and downstream data delivery. The server application must therefore assess connection speeds, demands on communication pipelines as well as pipeline capacities. The task is multifaceted.

Throughput on a given port is of primary importance. However, throughput depends on number of factors including the connecting hub's internet connection speed. When a hub checks in with the server application, the request includes connection speed information about the network on which the hub resides. The connection speed information may include signal strength of the hub's wireless connection to a local router. It should be noted that wireless transmitters including WiFi, ZigBee, Z-wave and Bluetooth devices broadcast information of signal strength within their transmissions. Of course, greater distances between the hub and router generally weaken strength of the wireless connection. Low signal strength corresponds to a degradation in the network's internet connection speed corresponding to reduced throughput at the server side connection endpoint. Further, the TCP port configuration parameters including TCP Receive Window influence throughput on the port. The port configuration uses under one embodiment the TCP configuration parameters and internet connection speed (corresponding to round trip time of the connection path) to estimate the number of bits per second that a particular hub/port pathway may handle. It should be noted that other factors may affect throughput including the probability of packet loss along the connection path.

In addition to the question of throughput, there is great variation in the size and content of incoming data requests. For example, a first hub may pass along data of a single device which itself may report low levels of device event/status data. The corresponding data payload may be small requiring a small number of datagrams in relation to a hub which queues, packetizes and forwards data from multiple devices reporting large amounts of event/status data. Accordingly, each brokered request differs in the amount of data queued for delivery. When a hub checks in with the server application, the hub may under one embodiment provide metadata indicating the size of the impending data transfer along with speed information of the local network's internet connection.

The server application may use the connection speed information and throughput determination to estimate the total data transfer per unit time on port for a particular hub connection request. Given the total payload of the connection request, the server application may also estimate the total time required to process a hub's connection request.

Under one embodiment, the server application essentially manages server/hub connection time. As one example, Device 1 checks-in (every 15 minutes) and transmits 158 bytes of data. This transaction takes 1,500 ms to complete. Note that Device 1 may represent an internet aware hub transmitting Device 1 data or an end user device communicating with server application under alternative means (see FIG. 2 and corresponding description). Continuing with the example, Device 2 checks-in (also every 15 minutes) and transmits 158 bytes of data. This transaction takes 90 ms to complete. Note that Device 2 may represent an internet aware hub transmitting Device 2 data or an end user device communicating with server application under alternative means (see FIG. 2 and corresponding description).

An embodiment of a load balancing algorithm may take the Device 1 check-in interval (15 minutes), multiply by 60 (seconds/minute) to convert to 900 seconds, multiply by 1000 (milliseconds/second) to convert to 900000 ms, then divide that number by the time it took to transmit the data (1,500 ms)). For Device 1, that would be 600. That means approximately 600 devices may perform at Device 1's numbers on a given port and, statistically, never have more than 1 connection open at a time. Under one embodiment, the algorithm multiplies the approximate 600 number by the number of simultaneous connections that may be supported on a single port, which is approximately 60000 under one embodiment. This computation indicates that approximately 36 million devices may performing at Device 1's numbers on a single port. In order to account for errors and to buffer the computation, such number may be reduced by a flat percentage rate of say 20% under an embodiment, such that approximately 28.8 million devices may perform at Device 1's numbers on a single port. With this information, if more than 28.8 million devices performing at Device 1's numbers are sold, additional devices would need to check-in on a second port under one embodiment.

Now considering the math for Device 2's numbers, things change a lot. An embodiment of one algorithm may take the Device 2 check-in interval (15 minutes), multiply by 60 (seconds/minute) to convert to 900 seconds, multiply by 1000 (milliseconds/second) to convert to 900000 ms, then divide that number by the time it took to transmit the data (90 ms)). For Device 2, that would be 10,000. That means approximately 10,000 devices may perform at Device 2's numbers on a given port and, statistically, never have more than 1 connection open at a time. Under one embodiment, the algorithm multiplies the approximate 10,000 number by the number of simultaneous connections that may be supported on a single port, which is approximately 60000 under one embodiment. This computation indicates that approximately 600 million devices may performing at Device 2's numbers on a single port. In order to account for errors and to buffer the computation, such number may be reduced by a flat percentage rate of say 20% under an embodiment, such that approximately 480 million devices may perform at Device 2's numbers on a single port. With this information, if more than 480 million devices performing at Device 2's numbers are sold, additional devices would need to check-in on a second port under one embodiment.

The time it takes to transmit data (i.e., 1500 ms vs. 90 ms is influenced by many things, and the load balancing algorithm may be proactively designed using trends under an embodiment. For example, it is known that wifi connection strength plays a major role in how fast data gets up and down on a wifi enabled device. Accordingly, the algorithm incorporates such information under an embodiment. Under another embodiment, it may be understood that certain hardware in one device model may not work as well in cold temperatures. A load balancing algorithm may therefore proactively place those device models registered in colder climates on a less crowded port. The load balancing algorithm may evolve to include hundreds of contributing factors under one embodiment.

When local hubs check in with server, the server application may under one embodiment use an estimated length of transmission (with respect to the amount of data the hub seeks to upload) in view of port throughput to intelligently route communication requests. As one example, the server application may aggregate hub requests requiring 2 second connections on one port. As another example, the server application may aggregate slower connections (requiring lengthy transmission periods) on a different port. In this manner, low resource intensive connection requests do not wait in line behind lengthy send/receive sessions.

It should be noted that when the server application assigns the hub a new port, the server application instructs the hub to use the new port the next time it checks in with the application. As described above, the application on the cloud server monitors a range of Transmission Control Protocol (TCP) ports for the number of interne connection requests and the customer's internet connection speed. When a hub makes a connection to the cloud server, the application may under one embodiment assign the hub a new TCP port to reconnect on the next time it makes a connection request. As additional hubs connect, they will be assigned a new TCP port to use until the application determines that a particular port is at maximum capacity. When a connection request is made, the hub will send an initial series of packets that contain connection speed information about the consumer network on which the hub resides. Depending on the connection speed and corresponding throughput estimation, the application will send a message to the hub containing a new port on which to connect. This TCP Port Hopping application allows a hub to get the best possible connection based on environmental variables.

As another example of port allocation, assume that two hubs each communicate with ten on-premise devices. Each hub collects data from such devices for later transmission to the cloud server. Assume also that each hub resides on a network with a very slow internet connection. When the hubs check in with the server, they initiate a TCP session at a commonly assigned port. Given the size of the data transmissions with respect to the connecting hubs, the server application is aware that the communication requests at the port will tie up the port for twenty minutes. When a third hub checks into the server at the same port, the server application determines that the additional request exceeds the capacity of the port. The server application sends the hub an instruction that the next time that hub checks in with the server application, the hub should check in at another port. One embodiment determines maximum capacity as the point at which an entire port connection pool is consumed, i.e. when the simultaneous connection limit has been reached.

Figure 2:
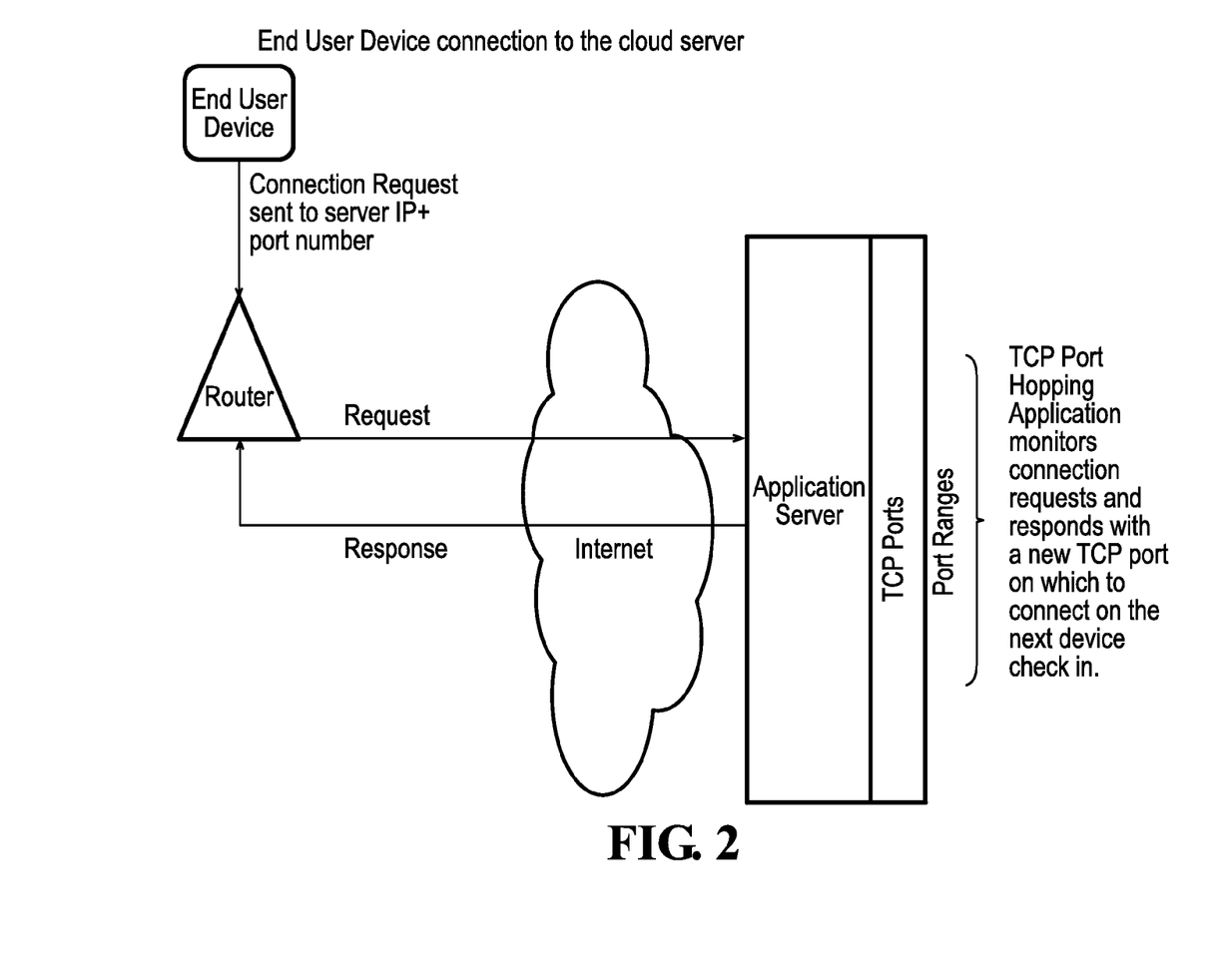
FIG. 2 is a diagram of an end user device communicating with an application server through a router under an embodiment.

Under an alternative embodiment, end user devices may connect directly to the cloud server via wifi or Ethernet connection to a home router but embodiments are not so limited. FIG. 2 is a diagram of an end user device communicating with an application server through a router under an embodiment. Such end user device may communicate directly with the server application and may assume the data collection and transmission responsibilities of the hub. Likewise, the server application may under one embodiment communicate with end user devices without the use an on premise internet aware hub. An end user device and server application may communicate with each other to provide all of the systems and methods provided herein without the use of an internet aware hub. Under one embodiment, an end user device may provide all of the functionality of an internet aware hub as described herein. Under such embodiment, an end user device may act a master device to other end user devices and may collect data from and transmit data on behalf of such other devices.

Figure 3:
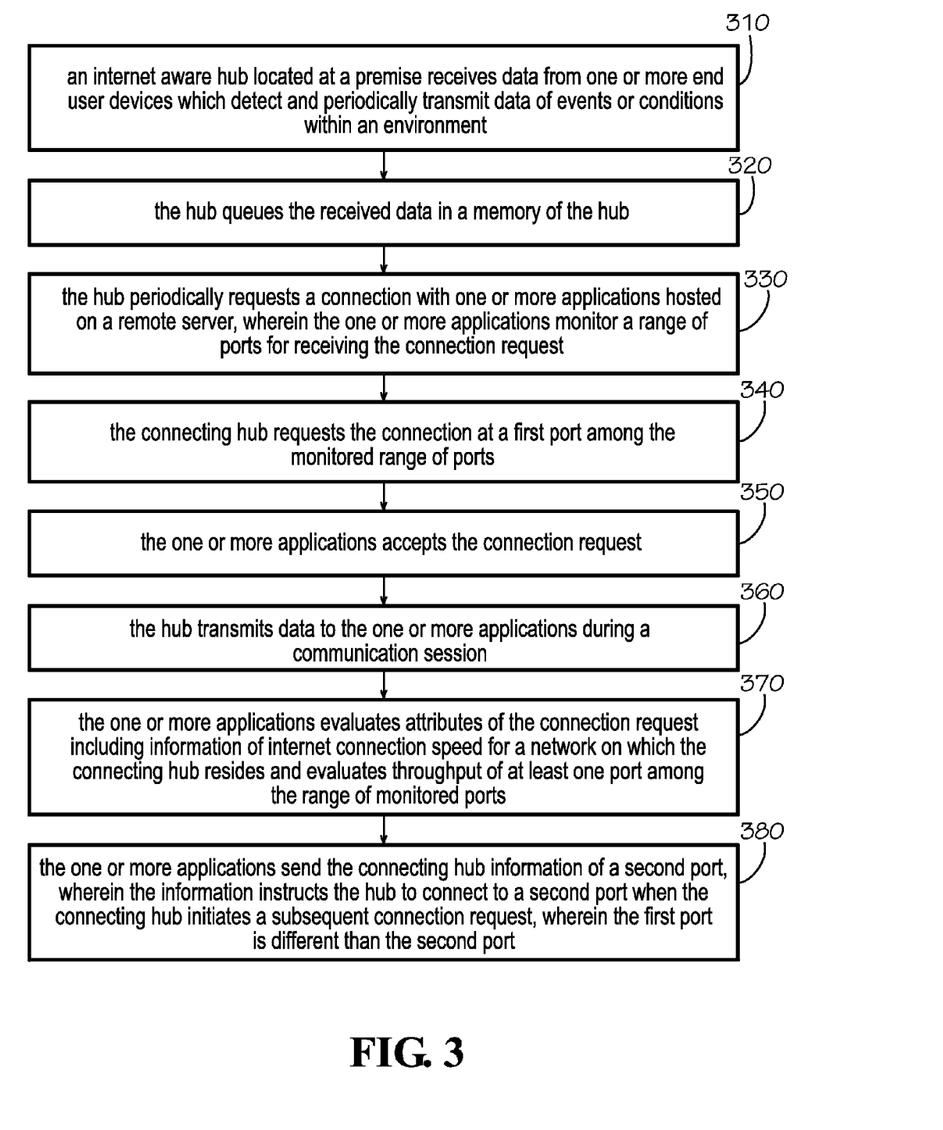
FIG. 3 is flowchart showing steps of a method for assigning incoming communication requests to a range of transmission control protocol ports under an embodiment.

FIG. 3 is flowchart showing steps of a method for assigning incoming communication requests to a range of transmission control protocol ports under an embodiment. In step 310, an internet aware hub located at a premise receives data from one or more end user devices which detect and periodically transmit data events or condition within an environment. In step 320, the hub queues the received data in a memory of the hub. In step 330, the hub periodically requests a connection with one or more applications hosted on a remote server, wherein the one or more applications monitor a range of ports for receiving the connection request. In step 340, the connecting hub requests a connection at a first port among the monitored range of ports. In step 350, the one or more applications accept the connection request. In step 360, the hub transmits the data to the one or more applications during a communication session. In step 370, the one or more applications evaluate attributes of the connection request including information of interne connection speed for a network on which the connecting hub resides and evaluates throughput of at least one port among the range of monitored ports. In step 380, the one or more applications send the connecting hub information of a second port instructing the hub to connect to the second port when the connecting hub initiates a subsequent connection request, wherein the first port is different than the second port.

Figure 4:
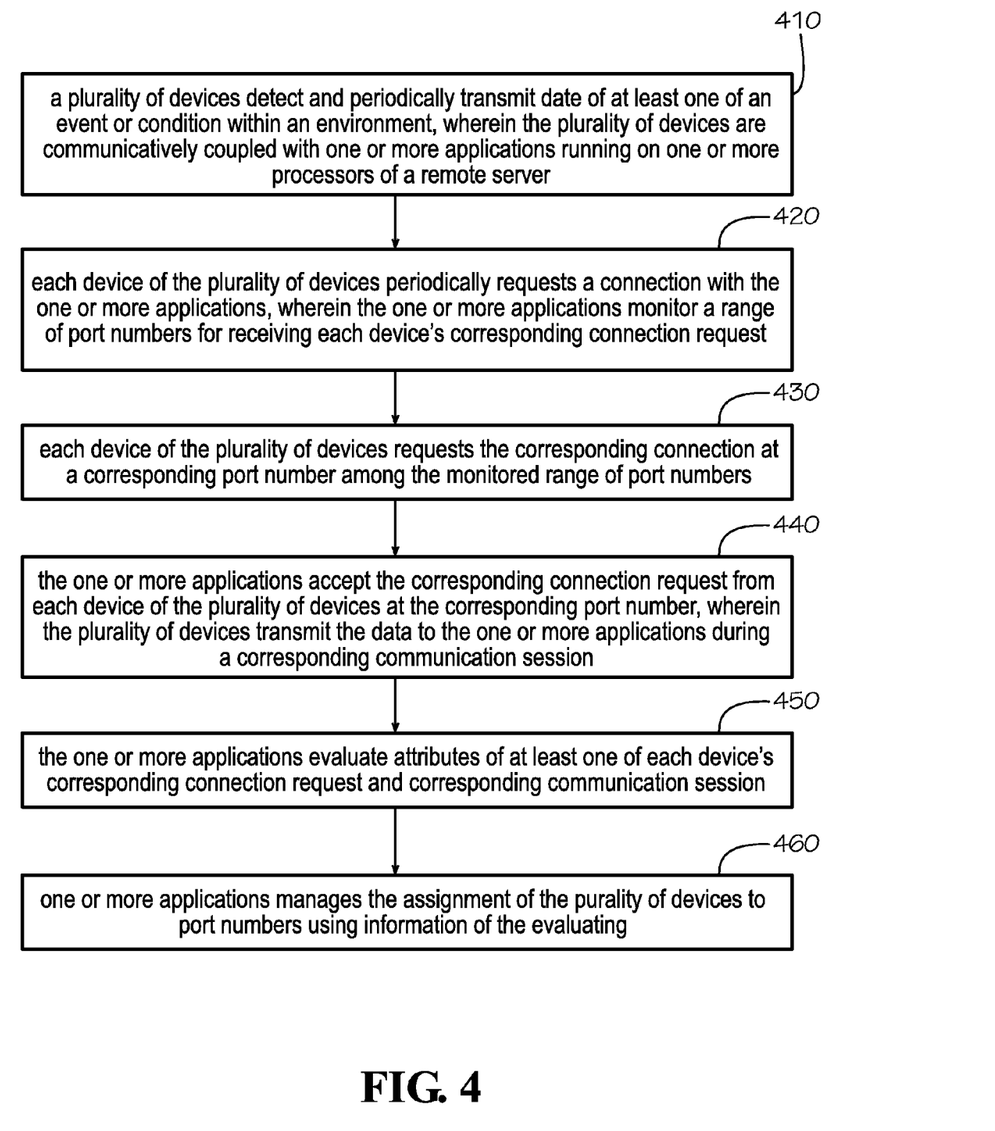
FIG. 4 is a flowchart showing steps of a system that manages and assigns incoming communication requests to a range of transmission control protocol ports under an embodiment.

FIG. 4 is a flowchart showing steps of a system that manages and assigns incoming communication requests to a range of transmission control protocol ports under an embodiment. Under step 410 a plurality of devices detect and periodically transmit data of at least one of an event or condition within an environment, wherein the plurality of devices are communicatively coupled with one or more applications running on one or more processors of a remote server. Under step 420 each device of the plurality of devices periodically requests a connection with the one or more applications, wherein the one or more applications monitor a range of port numbers for receiving each device's corresponding connection request. Under step 430 each device of the plurality of devices requests the corresponding connection at a corresponding port number among the monitored range of port numbers. Under step 440 the one or more applications accept the corresponding connection request from each device of the plurality of devices at the corresponding port number, wherein the plurality of devices transmit the data to the one or more applications during a corresponding communication session. Under step 450 the one or more applications evaluate attributes of at least one of each device's corresponding connection request and corresponding communication session. Under step 460, the one or more applications manage the assignment of the plurality of devices to port numbers using information of the evaluating.

A system of an embodiment comprises a plurality of devices detecting and periodically transmitting data of at least one of an event or condition within an environment, wherein the plurality of devices are communicatively coupled with one or more applications running on one or more processors of a remote server. Each device of the plurality of devices periodically requests a connection with the one or more applications, wherein the one or more applications monitor a range of port numbers for receiving each device's corresponding connection request, wherein each device of the plurality of devices requests the corresponding connection at a corresponding port number among the monitored range of port numbers. The one or more applications accept the corresponding connection request from each device of the plurality of devices at the corresponding port number, wherein the plurality of devices transmit the data to the one or more applications during a corresponding communication session. The one or more applications evaluate attributes of at least one of each device's corresponding connection request and corresponding communication session and managing assignment of the plurality of devices to port numbers using information of the evaluating.

The managing the assignment of the plurality of devices under an embodiment comprises assigning devices of the plurality of devices to new corresponding port numbers.

The assigning the devices of the plurality of devices to the new corresponding port numbers under an embodiment comprises sending the devices information of the new corresponding port numbers, wherein the information instructs the devices to connect to the new corresponding port numbers when the devices initiate subsequent connection requests.

The initiating subsequent connection requests under an embodiment includes initiating all subsequent requests at the new corresponding port numbers until receiving an instruction to connect to another port number.

The at least one of an event or condition under an embodiment includes detected movement, activity and position of one or more animals in the environment.

Each device's corresponding communication session under an embodiment comprises a TCP/IP communication session.

One or more port numbers of the range of port numbers under an embodiment may each accept 60,000 simultaneous connections.

The attributes under an embodiment include metadata.

The metadata under an embodiment includes information of signal strength of the device's connection to a local router or local networking device.

The metadata under an embodiment includes a size of the data transfer from the corresponding device.

The one or more applications under an embodiment evaluate the attributes includes estimating the speed of data transfer on a port number for each device's corresponding communication session.

The estimating the speed of the data transfer on a port number for each device's corresponding communication session under an embodiment uses information of interne connection speed along a pathway between the device and the port number.

The estimating the speed of the data transfer on a port number for each device's corresponding communication session under an embodiment uses information of the port number configuration parameters.

the estimating the speed of the data transfer on a port number for each device's corresponding communication session uses information of the signal strength of the device's connection to a local router or networking device.

The estimating the speed of the data transfer on a port number for each device's corresponding communication session under an embodiment uses information of at least one of the device's operational and performance parameters.

The one or more applications evaluating the attributes includes estimating a length of data transfer on a port number for each device's corresponding communication session under an embodiment uses the estimated speed of the data transfer and the size of the data transfer from the device.

The one or more applications evaluating the attributes indicates under an embodiment that each device of a first set of devices requires a first average length of data transfer on a first port number, wherein the plurality of devices includes the first set.

The determining the size of the first set is under an embodiment based upon the first average length of data transfer, information of time intervals between the periodic data transmissions of each device of the first set, and number of connections available on the first port number.

The one or more applications evaluating the attributes indicates under an embodiment that each device of a second set of devices requires a second average length of data transfer on a second port number, wherein the plurality of devices includes the second set.

Determining the size of the second set is under an embodiment based upon the second average length of data transfer, information of time intervals between the periodic data transmissions of each device of the second set, and number of connections available on the second port number.

The first average length of data transfer is under an embodiment different than the second average length of data transfer.

The managing the assignment of the plurality of devices comprises under an embodiment assigning the first set of devices of the plurality of devices to the first port number.

The managing assignment of the plurality of devices comprises under an embodiment assigning the second set of devices of the plurality of devices to the second port number.

The data periodically transmitted by each device of the plurality of devices comprises under an embodiment queued data.

The data periodically transmitted by each device of the plurality of devices comprises under an embodiment a message indicating the absence of the queued data.

The corresponding communication session comprises under an embodiment the one or more applications transmitting device data to each corresponding device.

The environment includes under an embodiment at least one premise.

The plurality of devices are under an embodiment communicatively coupled to the one or more applications through a corresponding local router or network connection device of the at least one premise.

The plurality of devices are under an embodiment communicatively connected to a corresponding local internet aware hub of the at least one premise, wherein the corresponding local internet aware hub is communicatively coupled to the one or more applications through a corresponding local router or network connection device of the at least one premise.

A method comprises under an embodiment an interne aware hub located at a premise and receiving data from one or more end user devices, wherein the end user devices are communicatively coupled with the hub, the end user devices detecting and periodically transmitting data of at least one of an event or condition within an environment, wherein the hub is communicatively coupled with one or more applications running on at least one processor of a remote server. The hub queues the received data in a memory of the hub. The hub periodically requests a connection with the one or more applications, wherein the one or more applications monitor a range of ports for receiving the connection request, wherein the connecting hub requests the connection at a first port among the monitored range of ports. The one or more applications accept the connection request, wherein the hub transmits data to the one or more applications during a communication session. The one or more applications evaluate attributes of the connection request including information of interne connection speed for a network on which the connecting hub resides and evaluate throughput of at least one port among the range of monitored ports. The one or more applications send the connecting hub information of a second port, wherein the information instructs the hub to connect to a second port when the connecting hub initiates a subsequent connection request at the second port, wherein the first port is different than the second port.

The data transmitted by the hub comprises under an embodiment the queued data.

The data transmitted by the hub comprises under an embodiment a message indicating the absence of the queued data.

The initiating a subsequent connection request includes under an embodiment initiating all subsequent requests at the second port until receiving an instruction to connect to another port.

The communication session comprises under an embodiment the one or more applications transmitting device data to the hub for delivery to an end user device, wherein the hub queues the device data in the memory.

The hub transmits the device data to the end user device under an embodiment.

The system, method and apparatus for assigning communication requests to a range of transmission control protocol ports can be a component of a single system, multiple systems, and/or geographically separate systems. Such systems and methods can also be a subcomponent or subsystem of a single system, multiple systems, and/or geographically separate systems. The components of a system, method and apparatus for assigning communication requests to a range of transmission control protocol ports can be coupled to one or more other components (not shown) of a host system or a system coupled to the host system.

One or more components of the system, method and apparatus for assigning communication requests to a range of transmission control protocol ports and/or corresponding interfaces, systems or applications to which such system, method and apparatus are coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the system, method and apparatus for assigning communication requests to a range of transmission control protocol ports can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the system, method and apparatus for assigning communication requests to a range of transmission control protocol ports and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system, method and apparatus for assigning communication requests to a range of transmission control protocol ports and corresponding systems and methods include: microcontrollers with memory (such as electronically erasable programmable read only memory (EEPROM)), embedded microprocessors, firmware, software, etc. Furthermore, aspects of the system, method and apparatus for assigning communication requests to a range of transmission control protocol ports and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Computer networks suitable for use with the embodiments described herein include local area networks (LAN), wide area networks (WAN), Internet, or other connection services and network variations such as the world wide web, the public interne, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the system, method and apparatus for assigning communication requests to a range of transmission control protocol ports and corresponding systems and methods is not intended to be exhaustive or to limit the systems and methods to the precise forms disclosed. While specific embodiments of, and examples for, the system, method and apparatus for assigning communication requests to orange of transmission control protocol ports and corresponding systems and methods are described herein for illustrative purposes, various equivalent modifications are possible within the scope of the systems and methods, as those skilled in the relevant art will recognize. The teachings of the system, method and apparatus for assigning communication requests to a range of transmission control protocol ports and corresponding systems and methods provided herein can be applied to other systems and methods, not only for the systems and methods described above.

The elements and acts of the various embodiments described above can be combined to provide further embodiments. These and other changes can be made to the system, method and apparatus for assigning communication requests to a range of transmission control protocol ports and corresponding systems and methods in light of the above detailed description.

The invention claimed is:

1. A system comprising:
a plurality of devices detecting and periodically transmitting data of at least one of an event or condition within an environment, wherein the plurality of devices are communicatively coupled with one or more applications running on one or more processors of a remote server;
each device of the plurality of devices periodically requesting a connection with the one or more applications, wherein the one or more applications monitor a range of port numbers for receiving each device's corresponding connection request, wherein each device of the plurality of devices requests the corresponding connection at a corresponding port number among the monitored range of port numbers;
the one or more applications accepting the corresponding connection request from each device of the plurality of devices at the corresponding port number, wherein the plurality of devices transmit the data to the one or more applications during a corresponding communication session;
the one or more applications evaluating attributes of at least one of each device's corresponding connection request and corresponding communication session and managing assignment of the plurality of devices to port numbers using information of the attributes, wherein the managing the assignment of the plurality of devices comprises assigning devices of the plurality of devices to new corresponding port numbers, wherein the new corresponding port numbers comprise different port numbers.

2. The system of claim 1, wherein the assigning the devices of the plurality of devices to the new corresponding port numbers comprises sending the devices information of the new corresponding port numbers, wherein the information instructs the devices to connect to the new corresponding port numbers when the devices initiate subsequent connection requests.

3. The system of claim 2, wherein the initiating subsequent connection requests includes initiating all subsequent requests at the new corresponding port numbers until receiving an instruction to connect to another port number.

4. The system of claim 1, wherein the at least one of an event or condition includes detected movement, activity and position of one or more animals in the environment.

5. The system of claim 1, wherein each device's corresponding communication session comprises a TCP/IP communication session.

6. The system of claim 1, wherein one or more port numbers of the range of port numbers may each accept 60,000 simultaneous connections.

7. The system of claim 1, wherein the attributes include metadata.

8. The system of claim 7, wherein the metadata includes information of signal strength of the corresponding device's connection to a local router or local networking device.

9. The system of claim 8, wherein the metadata includes a size of the data transfer from the corresponding device.

10. The system of claim 9, wherein the one or more applications evaluating the attributes includes estimating the speed of data transfer on a port number for each device's corresponding communication session.

11. The system of claim 10, wherein the estimating the speed of the data transfer on a port number for each device's corresponding communication session uses information of internet connection speed along a pathway between the device and the port number.

12. The system of claim 10, wherein the estimating the speed of the data transfer on a port number for each device's corresponding communication session uses information of the port number configuration parameters.

13. The system of claim 10, wherein the estimating the speed of the data transfer on a port number for each device's corresponding communication session uses information of the signal strength of the device's connection to a local router or networking device.

14. The system of claim 10, wherein the estimating the speed of the data transfer on a port number for each device's corresponding communication session uses information of at least one of the device's operational and performance parameters.

15. The system of claim 10, wherein the one or more applications evaluating the attributes includes estimating a length of data transfer on a port number for each device's corresponding communication session using the estimated speed of the data transfer and the size of the data transfer from the device.

16. The system of claim 15, wherein the one or more applications evaluating the attributes indicates that each device of a first set of devices requires a first average length of data transfer on a first port number, wherein the plurality of devices includes the first set.

17. The system of claim 16, wherein determining the size of the first set is based upon the first average length of data transfer, information of time intervals between the periodic data transmissions of each device of the first set, and number of connections available on the first port number.

18. The system of claim 17, wherein the one or more applications evaluating the attributes indicates that each device of a second set of devices requires a second average length of data transfer on a second port number, wherein the plurality of devices includes the second set.

19. The system of claim 18, wherein determining the size of the second set is based upon the second average length of data transfer, information of time intervals between the periodic data transmissions of each device of the second set, and number of connections available on the second port number.

20. The system of claim 19, wherein the first average length of data transfer is different than the second average length of data transfer.

21. The system of claim 20, wherein the managing the assignment of the plurality of devices comprises assigning the first set of devices of the plurality of devices to the first port number.

22. The system of claim 21, wherein the managing assignment of the plurality of devices comprises assigning the second set of devices of the plurality of devices to the second port number.

23. The system of claim 1, wherein the data periodically transmitted by each device of the plurality of devices comprises queued data.

24. The system of claim 1, wherein the data periodically transmitted by each device of the plurality of devices comprises a message indicating the absence of the queued data.

25. The system of claim 1, the corresponding communication session comprising the one or more applications transmitting device data to each corresponding device.

26. The system of claim 1, wherein the environment includes at least one premises.

27. The system of claim 26, wherein the plurality of devices are communicatively coupled to the one or more applications through a corresponding local router or network connection device of the at least one premises.

28. The system of claim 27, wherein the plurality of devices are communicatively connected to a corresponding local internet aware hub of the at least one premises, wherein the corresponding local internet aware hub is communicatively coupled to the one or more applications through a corresponding local router or network connection device of the at least one premises.

29. A system comprising:
a plurality of devices detecting and periodically transmitting data of at least one of an event or condition within an environment, wherein the plurality of devices are communicatively coupled with one or more applications running on one or more processors of a remote server;
each device of the plurality of devices periodically requesting a connection with the one or more applications, wherein the one or more applications monitor a range of port numbers for receiving each device's corresponding connection request, wherein each device of the plurality of devices requests the corresponding connection at a corresponding port number among the monitored range of port numbers;
the one or more applications accepting the corresponding connection request from each device of the plurality of devices at the corresponding port number, wherein the plurality of devices transmit the data to the one or more applications during a corresponding communication session;
the one or more applications evaluating attributes of at least one of each device's corresponding connection request and corresponding communication session and dynamically assigning the plurality of devices to new corresponding port numbers using information of the attributes, wherein the new corresponding port numbers comprise different port numbers.

30. A system comprising:
a plurality of devices detecting and periodically transmitting data of at least one of an event or condition within an environment, wherein the plurality of devices are communicatively coupled with one or more applications running on one or more processors of a remote server;
each device of the plurality of devices periodically requesting a connection with the one or more applications, wherein the one or more applications monitor a range of port numbers for receiving each device's corresponding connection request, wherein each device of the plurality of devices requests the corresponding connection at a corresponding port number among the monitored range of port numbers;
the one or more applications accepting the corresponding connection request from each device of the plurality of devices at the corresponding port number, wherein the plurality of devices transmit the data to the one or more applications during a corresponding communication session;
the one or more applications evaluating attributes of at least one of each device's corresponding connection request and corresponding communication session and assigning the plurality of devices to new corresponding port numbers using information of the attributes, wherein the new corresponding port numbers comprise different port numbers, the evaluating the attributes including estimating a rate of data transfer at one or more ports of communication sessions of the plurality of devices.

31. A system comprising:
a plurality of devices detecting and periodically transmitting data of at least one of an event or condition within an environment, wherein the plurality of devices are communicatively coupled with one or more applications running on one or more processors of a remote server;
each device of the plurality of devices periodically requesting a connection with the one or more applications, wherein the one or more applications monitor a range of port numbers for receiving each device's corresponding connection request, wherein each device of the plurality of devices requests the corresponding connection at a corresponding port number among the monitored range of port numbers;
the one or more applications accepting the corresponding connection request from each device of the plurality of devices at the corresponding port number, wherein the plurality of devices transmit the data to the one or more applications during a corresponding communication session;

the one or more applications evaluating attributes of at least one of each device's corresponding connection request and corresponding communication session and assigning the plurality of devices to new corresponding port numbers using information of the attributes, wherein the new corresponding port numbers comprise different port numbers, the evaluating the attributes including estimating a rate of data transfer at one or more ports of communication sessions of the plurality of devices, the assigning the plurality of devices including distributing data throughput corresponding to communication sessions of the plurality of devices across the range of port numbers.

* * * * *